US011889001B2

(12) United States Patent
Smith

(10) Patent No.: US 11,889,001 B2
(45) Date of Patent: Jan. 30, 2024

(54) OPTICAL INTERFEROMETRIC-BASED PHYSICALLY UNCLONABLE FUNCTION DEVICE

(71) Applicant: GOVERNMENT OF THE UNITED STATES AS REPRESENTED BY THE SECRETARY OF THE AIR FORCE, Rome, NY (US)

(72) Inventor: A. Matthew Smith, Rome, NY (US)

(73) Assignee: United States of America as represented by the Secretary of the Air Force, Rome, NY (US)

( * ) Notice: Subject to any disclaimer, the term of this patent is extended or adjusted under 35 U.S.C. 154(b) by 61 days.

(21) Appl. No.: 16/357,428

(22) Filed: Mar. 19, 2019

(65) Prior Publication Data

US 2020/0304320 A1 Sep. 24, 2020

(51) Int. Cl.
*H04L 9/32* (2006.01)
*G02B 6/293* (2006.01)

(52) U.S. Cl.
CPC .......... *H04L 9/3278* (2013.01); *G02B 6/2935* (2013.01)

(58) Field of Classification Search
CPC ............................. H04L 9/3278; G02B 6/2935
See application file for complete search history.

(56) References Cited

U.S. PATENT DOCUMENTS

| 8,741,713 | B2 | 6/2014 | Bruley |
| 8,848,477 | B2 | 9/2014 | Schrijen |
| 8,971,527 | B2 | 3/2015 | BrightSky |
| 9,171,144 | B2 | 10/2015 | Lewis |
| 9,502,356 | B1 | 11/2016 | Parvarandeh |
| 2007/0090312 | A1* | 4/2007 | Stallinga ............... H04L 9/3278 250/580 |
| 2012/0106235 | A1 | 5/2012 | Christensen |
| 2015/0215115 | A1 | 7/2015 | Pikus |

OTHER PUBLICATIONS

An integrated optical physically unclonable function using process-sensitive sub-wavelength photonic crystals in 65nm CMOS, X. Lu, L. Hong and K. Sengupta, 2017 IEEE International Solid-State Circuits Conference (ISSCC), San Francisco, CA, 2017, pp. 272-273. doi: 10.1109/ISSCC.2017.7870366.
Optical physical unclonable function, M. Geis, K. Gettings and M. Vai, 2017 IEEE 60th International Midwest Symposium on Circuits and Systems (MWSCAS), Boston, MA, 2017, pp. 1248-1251.
Silicon photonic physical unclonable function, Brian C. Grubel, Bryan T. Bosworth, Michael R. Kossey, Hongcheng Sun, A. Brinton Cooper, Mark A. Foster, and Amy C. Foster, Opt. Express 25, 12710-12721 (2017).

(Continued)

*Primary Examiner* — Robert B Leung
(74) *Attorney, Agent, or Firm* — AFRL/RIJ; Randall P. Jones

(57) ABSTRACT

An apparatus for implementing a physically unclonable function via a network of interferometers implemented as a reconfigurable integrated optical circuit. The uncontrollable and non repeating fabrication variation in the manufacturing processes of integrated optics, combined with the sensitivity of interferometers creates inherently unique devices that can be used as reprogrammable physically unclonable function.

12 Claims, 2 Drawing Sheets

(56) References Cited

OTHER PUBLICATIONS

Physical Unclonable Function based on a Multi-Mode Optical Waveguide, Mesaritakis, Charis & Akriotou, Marialena & Kapsalis, Alexandros & Grivas, Evangelos & Chaintoutis, Charidimos & Nikas, Thomas & Syvridis, D. Scientific Reports. 8. 10.1038/s41598-018-28008-6.

Ring oscillator physical unclonable function with multi level supply voltages, S. S. Mansouri and E. Dubrova, 2012 IEEE 30th International Conference on Computer Design (ICCD), Montreal, QC, 2012, pp. 520-521. Doi:10.1109/ICCD.2012.6378703.

* cited by examiner

OPTICAL INTERFEROMETRIC-BASED PHYSICALLY UNCLONABLE FUNCTION DEVICE

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the creation of a Physically Unclonable Function (PUF) device. A PUF is a device or process that is sufficiently delicate to the point that it is in practice impossible to recreate the exact behavior of the device or process. Such PUFs are currently in use as authentication tokens and cryptographic key seeds among other applications. A basic operating procedure for a PUF is as follows. First, the device is fabricated. Second, the device is characterized: meaning one user (the provider) applies a set of so-called challenges and records the unique response of the device. These are called Challenge and Response Pairs (CRPs). The nature of both the challenge and the response depends on the implementation method and underlying technology of the PUF. Third, the device is given to a second party (i.e. a user) or sent a remote site. When the provider wants to authenticate to whom they are speaking, they can tell the user to apply a specific challenge and reply with the resulting response. If the response is the same as previously measured by the provider, then the user is authenticated. Note that the provider and user are described above in the convent terms of a network authentication application, however PUFS are not limited to such an application and the provider and user can exist with a single device or a computer chip among other configurations and be used for a different purpose such a cryptographic key generation. The current state of the art contains a diverse set of physical implementations of PUFs due to the intense interest in device and network security. Most state of the art devices are electronic and implemented with the intension of close integration with existing computer chip technology.

State of the art electronic PUFs include among others those based on: random access memory (RAM) such as [1,2], latching circuits such as [3], electrical coatings [4] and other integrated electronics [5,6].

PUFs may also be implemented with various optical components. These include the optical phase shift PUF of [7], the macroscopic nonlinear crystal PUF of [8] and the bulk polymer device of [9]. More desirable than these bulky optical devices would be PUFs implemented in integrated optics. Here "integrated optics" refers to both silicon on insulator Sol materials used in CMOS and other nanofabrication processes as well as other materials such as but not limited to Lithium Niobate ($LiNbO_3$), Gallium Phosphate ($GaPO_4$) etc. The potential advantages of integrated optical PUFs could be size and ease of integration with existing nanofabrication methods. The basic principle behind proposed integrated optical PUFs would be to use the inconsistency of nanofabrication processes to create a device that cannot be reproduced by any means because its response depends strongly on details of its construction that are smaller than the fabrication tolerance of the nanofabrication process itself. Thus even the original creator of a PUF, in theory, could not recreate the device despite knowing all details of its original design, having identical materials and the same fabrication devices.

Integrated optical PUFs have been proposed and demonstrated in several forms including: phase shifts induced by different path lengths [7], resonant cavity PUFs of [10], multimode waveguide propagation PUF of [11] and the Ring Oscillator PUF of [12]. These integrated optical PUFs each use aspects of a particular component common in integrated devices, (i.e. waveguides, cavities, rings etc.) and focus on its irreproducibility. Often this inconsistency is considered a negative attribute to be avoided. However when designing PUFs such as disclosed in the present invention, this otherwise undesirable behavior can be exploited for significant utility. Notwithstanding the aforesaid availability of integrated optical PUFs, what has been lacking thus far is a programmable physically unclonable function with a scalable large number of unique settings.

REFERENCES

[1] "Physical unclonable function with improved start-up behavior", G. J. Schrijen, P. W. Simons, E. V Der Sluis, P. T. Tuyls, U.S. Pat. No. 8,848,477B2
[2] "Implementing physically unclonable function (puf) utilizing edram memory cell capacitance variation", T. A. Christensen, J. E. Sheets, US20120106235A1
[3] "Electronic physical unclonable functions", J. M. Lewis, D. R. Walther, P. H. Horn, U.S. Pat. No. 9,171,144B2
[4] "Device and method with physical unclonable function", P. Parvarandeh, U.S. Pat. No. 9,502,356B1
[5] "Reliable physical unclonable function for device authentication", J. Bruley, V Narayanan, D. Pfeiffer J. O. Plouchart, P. Song U.S. Pat. No. 8,741,713B2
[6] "Reliable physical unclonable function for device authentication", M. J. Brightsky, C. H. Lam, D. Pfeiffer, U.S. Pat. No. 8,971,527B2
[7] "Optical physical uncloneable function", F. Pikus, US20150215115A1
[8] "15.9 An integrated optical physically unclonable function using process-sensitive sub-wavelength photonic crystals in 65 nm CMOS", X. Lu, L. Hong and K. Sengupta, 2017 *IEEE International Solid-State Circuits Conference (ISSCC)*, San Francisco, CA, 2017, pp. 272-273. doi: 10.1109/ISSCC.2017.7870366
[9] "Optical physical unclonable function," M. Geis, K. Gettings and M. Vai, 2017 *IEEE 60th International Midwest Symposium on Circuits and Systems (MWSCAS)*, Boston, MA, 2017, pp. 1248-1251.
[10] "Silicon photonic physical unclonable function", Brian C. Grubel, Bryan T. Bosworth, Michael R. Kossey, Hongcheng Sun, A. Brinton Cooper, Mark A. Foster, and Amy C. Foster, Opt. Express 25, 12710-12721 (2017)
[11] "Physical Unclonable Function based on a Multi-Mode Optical Waveguide", Mesaritakis, Charis & Akriotou, Marialena & Kapsalis, Alexandros & Grivas, Evangelos & Chaintoutis, Charidimos & Nikas, Thomas & Syvridis, D. Scientific Reports. 8. 10.1038/s41598-018-28008-6
[12] "Ring oscillator physical unclonable function with multi level supply voltages," S. S. Mansouri and E. Dubrova, 2012 IEEE 30th International Conference on Computer Design (ICCD), Montreal, QC, 2012, pp. 520-521. Doi:10.1109/ICCD.2012.6378703

OBJECTS AND SUMMARY OF THE INVENTION

An object of the present invention is to provide a new design for an optical integrated physically unclonable function (PUF) that takes advantage of the reconfigurability of integrated optics and the sensitivity of optical interferometers to create a new form of PUF.

Another object of the present invention is to exploit the uncontrollability inherent to the fabrication of evanescent and other types of waveguide couplers with the stability and scalability of integrated optical devices to create a programmable physically unclonable function with a larger number of unique settings.

Briefly stated, the present invention provides an apparatus for implementing a physically unclonable function via a network of interferometers implemented as a reconfigurable integrated optical circuit. The uncontrollable and non-repeating fabrication variation in the manufacturing processes of integrated optics, combined with the sensitivity of interferometers creates inherently unique devices that can be used as reprogrammable physically unclonable function.

A preferred embodiment of the present invention consists of an array of interconnected interferometers implemented in an integrated optical platform such as but not limited to silicon on insulator (SoI), which can be made compatible with CMOS. The fabrication of integrated waveguide devices is well developed in the state of the art and we utilize the same technology for the fabrication of our devices. Integrated optics consists of waveguides imbedded in a stable material platform such that light is confined to follow the path of the waveguide. The preferred embodiment is described in term of SoI waveguides but any integrated optical platform can be substituted as a trivial change.

A preferred embodiment of the optical interferometry PUF consists of a set of interconnected 2×2 Mach-Zender Interferometers (MZIs). MZIs are a well developed component of integrated optical devices. The present invention employs a set of such devices to a novel and non-obvious use.

Each MZI is individually addressable and tunable to some extent, ideally at least a full $2\pi$ range (i.e. full switching ability). The tunability of the set of MZIs will be considered the PUF challenge. The interferometers are connected or "wired" in such a way that an input of coherent light is scattered to multiple outputs. The measurement of the outputs is considered the response of the PUF. Thus creating the challenge and response pair (CRP) that is typical of PUFs. The preferred embodiment of the SoI platform is thermo-optic such that the MZI can be tuned by changing the local temperature of a segment of each MZI through an integrated resistive heater. Thus the challenge to the preferred embodiment of the present invention is a set of voltages that are to be applied to the device and the response is the set of intensities of the light measured at each output while the challenge is being applied.

Other material implementations include electro-optic materials such as but not limited to $LiNbO_3$. In such materials, an MZI would be tuned by a voltage applied to a capacitor that straddles the waveguide. Such devices are known to have higher switching speeds and lower power draws, however this does not represent a significant change from the preferred embodiment described here.

The preferred embodiment of the device consists a triangular network of interferometers such that the number of MZIs in each column increases by one moving in the direction light travels. FIG. 1 shows a generic schematic of the waveguide interconnections of the preferred embodiment. FIG. 1 does not included the electrical routing on the chip as this can be configured in a myriad of ways all of which constitute trivial changes to the device. The size (i.e. number of MZIs) of the preferred embodiment has been tested and demonstrated as viable for use as a PUF at 10 MZIs. Increasing or decreasing the number of MZIs represents a trivial change in the scaling of the device. Likewise using other shapes such as a square network is not a significant change to the operation of the present invention.

A significant concern of the optical integrated PUF is what is known as the visibility of an MZI. This relates to the quality of the interference inside the device. A visibility of 100% implies the ability to steer all of the incident light into one output or the other without "leaking" light to the undesired waveguide. To maximize the visibility the loss in each arm of the waveguide must be the same. Here we define loss as the portion of light that escapes the waveguide while propagating across a portion of the device. The phase shifter in each MZI in the preferred embodiment is close enough to the waveguide to disturb the optical mode and induce a small amount of loss. To maintain the visibility in the preferred embodiment we place a "dummy" phase module on the opposite arm such that the loss of both arms of the MZI is similar. The second phase modular may or may not be used in the tuning of the device without significant change to the present invention.

The output of each MZI in the preferred embodiment is two waveguides, which split and are touted to two separate MZI in the next row. Thus the splitting of the first MZI affects the intensities of light entering the next two MZI. Light from a single input then propagates in a cone shape as it moves through the dives. The preferred embodiment is such that light from the first MZI can potential reach all other MZIs and all outputs. In this way no resources (i.e. MZIs or output waveguides) are wasted.

Specifically in the preferred embodiment of the present invention, a physically unclonable function device comprises a plurality of columns each having integer (n+1) number of optical interferometers, where n for a first column has a value of 0 and where the value of n is incremented by 1 for each successive column after the first column, where each optical interferometer having a first and a second input waveguide and a first and a second output waveguide; also where the first output waveguide of an optical interferometer in a preceding column is connected to the second input waveguide of an optical interferometer in a subsequent column, and where the second output waveguide of the optical interferometer in the preceding column is connected to the first input waveguide of the optical interferometer in said subsequent column; the physically unclonable function device further comprises a plurality of unclonable function device outputs comprising the first and the second output waveguides of each optical interferometer in a last column of the plurality of columns and a plurality of unclonable function device inputs comprising a combination of the first and the second input waveguides of at least one optical interferometer in each of said plurality of columns. Light that is input into at least any one of the plurality of unclonable function device inputs is output from at least one of the plurality of unclonable function device outputs. Tuning any of the optical interferometers controls the presence of light, which is input into at least any one of said plurality of unclonable function device inputs, at the output of the plurality of unclonable function device outputs.

Still comprising the preferred embodiment of the present invention, the optical interferometers comprise a first evanescent directional coupler having a first input connected to the first input waveguide and a second input connected to the second input waveguide, the first evanescent directional coupler further having a first and a second output, a first phase shift element having an input and an output, wherein the input is connected to the first output of the first evanescent directional coupler, a second phase shift element having an input and an output where the input is connected to the second output of the first evanescent directional coupler, a second evanescent directional coupler having a first input connected to the output of the first phase shift element, a second input connected to the output of the second phase shift element, a first output connected to the first output waveguide and a second output connected to the second waveguide output.

DETAILED DESCRIPTION OF THE PREFERRED EMBODIMENT

Figure 1:
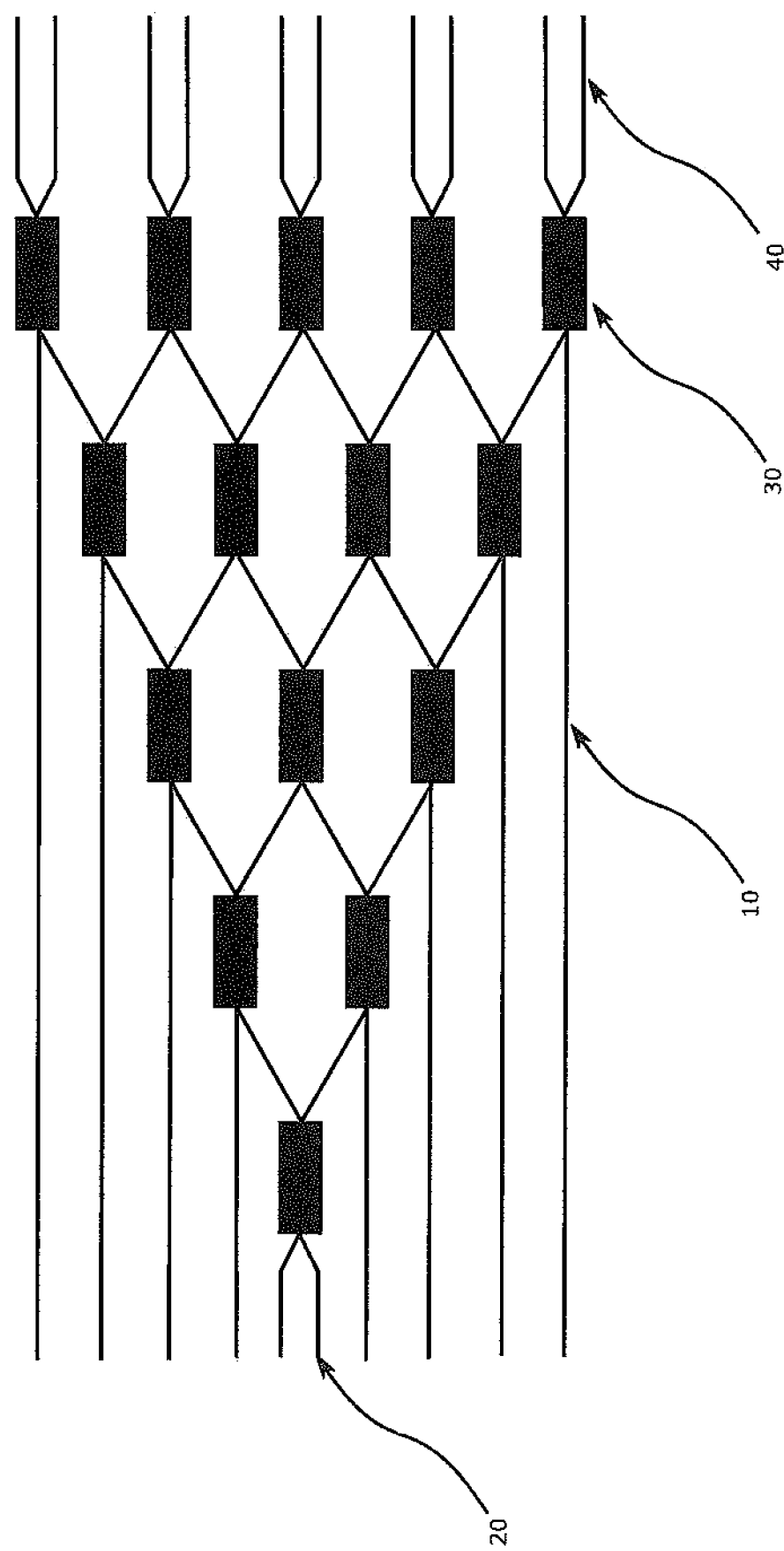
FIG. 1 is a schematic diagram representation of the interconnections between individual Mach-Zender interferometer (MZIs) in the present invention.

Referring to FIG. 1, the key components of the integrated optical PUF invention are shown. Light is assumed to propagate from left to right. This shows how the output of any given MZI 30 is split to two "nearest neighbor" MZIs in the next downstream column. Thus light from any one of several single device input waveguides 20 can spread to all possible MZIs 30 and device output waveguides 40. Waveguides such as 10 are depicted here as straight lines but may be contoured into any shape between the MZIs 30 without significant alteration of the invention. A main device input waveguide 20 is created such that light from this waveguide can reach all possible device output waveguides 40. FIG. 1 shows the manner of the interconnected nature of the MZIs 30. The MZI outputs (100, FIG. 2) of each individual 2×2 MZI 30 are split and feed into an MZI input (50, FIG. 2) of the next downstream column such that each MZI output (100, FIG. 2) goes to a downstream MZI 30 and into that downstream MZI's inputs (50, FIG. 2). Thus by tuning the MZIs 30 the light can be steered to any particular device output waveguide 40 or divided arbitrarily between them.

The electrical connections that are used to uniquely address and tune each MZI 30, are to not shown as there is a large degree of freedom in their layout that does not have any measureable effect on the operation of the device.

Figure 2:
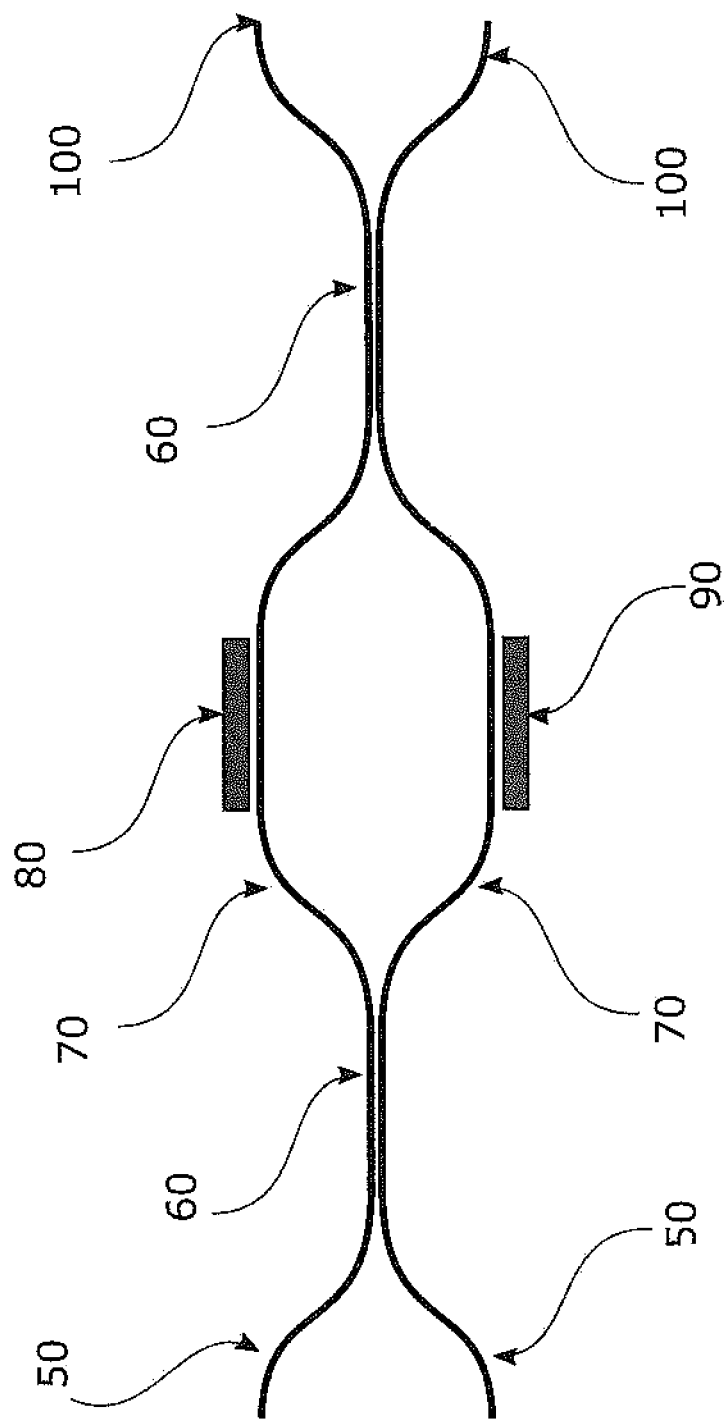
FIG. 2 is schematic diagram of a single Mach-Zender interferometer used in the preferred embodiment of the present invention. The diagram includes the evanescent directional couplers, resistive heat phase modulator and an unused phase modulator included is to make loss symmetric across both legs of the MZI. This basic schematic is repeated for each MZI.

Referring to FIG. 2, each MZI (30, FIG. 1) consists of several components. The MZIs in the preferred embodiment of the invention are 2×2 such that there are two MZI input waveguides 50. In the preferred embodiment the MZI input waveguides 50 lead to an approximately 50/50 evanescent directional coupler 60. Other integrated optical splitting devices such as, but not limited to, ring resonators and whispering gallery modes may be used in place of this component without affecting the scope of the current invention. The MZI consists of two arms 70 each containing phase shifting elements 80, 90. In the preferred SoI platform the phase shifters 80 are implemented as doped regions of silicon Si, such that they are conductive with a fixed resistance. The doped region is near but not touching the waveguide. Applying a voltage across the resistor results in localized heating of the material and a relative phase change between the arms of the MZI due to the thermo-optic effect and thermal expansion. Changes in the shape, style and design of the resistive elements only effect the power and phase changing efficiency of the MZI and not the overall design or operation of the invention. In the preferred embodiment the second phase shifter 90 need not be used or even electrically connected and exists to symmetrize the loss between both arms 70. A second directional coupler 60 recombines the arms and then splits into two device output waveguides 100.

What is claimed is:

1. A physically unclonable function device, comprising:
    a plurality of columns each having integer (n+1) number of optical interferometers, where n for a first column has a value of 0 and where the value of n is incremented by 1 for each successive column after the first column;
    each optical interferometer having a first and a second input waveguide and a first and a second output waveguide;
    wherein the first output waveguide of an optical interferometer in a preceding column is connected to the second input waveguide of an optical interferometer in a subsequent column, and
    wherein the second output waveguide of said optical interferometer in said preceding column is connected to the first input waveguide of said optical interferometer in said subsequent column;
    a plurality of unclonable function device outputs comprising the first and the second output waveguides of each optical interferometer in a last column of said plurality of columns; and
    a plurality of unclonable function device inputs comprising a combination of the first and the second input waveguides of at least one optical interferometer in each of said plurality of columns.

2. The physically unclonable function device of claim 1, wherein light that is input into at least any one of said plurality of unclonable function device inputs is output from at least one of said plurality of unclonable function device outputs.

3. The physically unclonable function device of claim 2, wherein tuning any of said optical interferometers controls the presence of light, which is input into at least any one of said plurality of unclonable function device inputs, at the output of said plurality of unclonable function device outputs.

4. The physically unclonable function device of claim 2, wherein said optical interferometers each comprise:
    a first evanescent directional coupler having a first input connected to said first input waveguide and a second input connected to said second input waveguide, said first evanescent directional coupler further having a first and a second output;
    a first phase shift element having an input and an output, wherein said input is connected to said first output of said first evanescent directional coupler;
    a second phase shift element having an input and an output, wherein said input is connected to said second output of said first evanescent directional coupler;
    a second evanescent directional coupler having a first input connected to said output of said first phase shift element, a second input connected to said output of said second phase shift element, a first output connected to said first output waveguide and a second output connected to said second waveguide output.

5. The physically unclonable function device of claim 4, wherein said phase shift elements comprise conductive doped regions of silicon Si having resistance.

6. The physically unclonable function device of claim 5, wherein phase shift elements produce heat when subjected to an applied voltage.

7. The physically unclonable function device of claim 6, wherein said heat produced by a phase shift element adjacent to an optical path between said first evanescent directional coupler and said second evanescent directional coupler causes a phase change in that optical path.

8. A physically unclonable function device, comprising:
an array of optical interferometers having inputs for light entering thereinto and outputs for light exiting therefrom;
an arrangement of successive columns of said optical interferometers wherein each successive column comprises one additional interferometer relative to the immediately preceding column;
light paths exiting any optical interferometer in a preceding column into two optical interferometers in the immediately succeeding column;
light paths exiting optical interferometers comprising the last column of optical interferometers being connected to the outputs of said array;
light paths entering the first column of optical interferometers being connected to the inputs of said array; and
wherein tuning any of said optical interferometers controls the presence of light that is output from said array.

9. The physically unclonable function device of claim 8 wherein tuning comprises a phase shift within said optical interferometer.

10. The physically unclonable function device of claim 9, wherein said phase shift is induced by heat.

11. The physically unclonable function device of claim 10, wherein said heat is induced by a voltage applied to a semiconducting material in the vicinity of light traversing said optical interferometer.

12. The physically unclonable function device of claim 11, wherein said semiconducting material comprises conductive doped regions of silicon Si having resistance.

\* \* \* \* \*